(12) United States Patent
Buttet et al.

(10) Patent No.: US 11,092,958 B2
(45) Date of Patent: Aug. 17, 2021

(54) EQUIPMENT FOR ASSISTING UNDERWATER EXPLORATION AND UNDERWATER ROBOT FOR THE EQUIPMENT

(71) Applicant: HUBLOT SA GENEVE, Geneva (CH)

(72) Inventors: Mathias Buttet, Monnaz (CH); Jean-Michel Blumenthal, Chavannes-des-Bois (CH)

(73) Assignee: HUBLOT SA, GENEVE, Geneva (CH)

( * ) Notice: Subject to any disclaimer, the term of this patent is extended or adjusted under 35 U.S.C. 154(b) by 25 days.

(21) Appl. No.: 15/559,187

(22) PCT Filed: Mar. 17, 2016

(86) PCT No.: PCT/EP2016/055899
§ 371 (c)(1),
(2) Date: Sep. 18, 2017

(87) PCT Pub. No.: WO2016/146797
PCT Pub. Date: Sep. 22, 2016

(65) Prior Publication Data
US 2018/0074489 A1 Mar. 15, 2018

(30) Foreign Application Priority Data
Mar. 17, 2015 (CH) ................................ 00365/15

(51) Int. Cl.
*G05D 1/00* (2006.01)
*B63C 11/12* (2006.01)
(Continued)

(52) U.S. Cl.
CPC ............ *G05D 1/0038* (2013.01); *B63C 11/12* (2013.01); *B63C 11/52* (2013.01); *B63G 8/001* (2013.01);
(Continued)

(58) Field of Classification Search
None
See application file for complete search history.

(56) References Cited

U.S. PATENT DOCUMENTS

| 4,217,709 A * | 8/1980 | Casciano | E02F 3/90 37/308 |
| 4,386,473 A * | 6/1983 | Amann | E02F 3/88 175/5 |

(Continued)

FOREIGN PATENT DOCUMENTS

| DE | 10 2010 051 491 A1 | 5/2012 |
| FR | 2967767 A1 | 5/2012 |

OTHER PUBLICATIONS

Deepsea Challenger Systems & Technology, Mar. 12, 2012, http://www.deepseachallenge.com/the-sub/systems-technology/ (Year: 2012).*

(Continued)

*Primary Examiner* — Dale W Hilgendorf
*Assistant Examiner* — Alexander C. Bost
(74) *Attorney, Agent, or Firm* — Westerman, Hattori, Daniels & Adrian, LLP

(57) ABSTRACT

The invention relates to equipment comprising an underwater robot (1) and a device (2) for the remote control of the robot, which can communicate with each other, wherein: the robot comprises means for underwater movement and an image-capturing device; and the control device comprises 3D glasses designed so that a user wearing the glasses views the underwater environment of the robot in three dimensions on the basis of the images captured by the robot, and means for remotely guiding the movement of the robot on the basis of the three-dimensional underwater environment viewed.

19 Claims, 12 Drawing Sheets

(51) Int. Cl.
  *B63C 11/52*  (2006.01)
  *B63G 8/00*  (2006.01)
  *B63C 3/06*  (2006.01)

(52) U.S. Cl.
  CPC .......... *B63C 3/06* (2013.01); *B63C 2011/121* (2013.01); *B63G 2008/005* (2013.01)

(56) References Cited

U.S. PATENT DOCUMENTS

| | | | | |
|---|---|---|---|---|
| 8,195,084 | B2* | 6/2012 | Xiao | B63C 11/02 |
| | | | | 434/4 |
| 9,591,271 | B2* | 3/2017 | Dinis | B63C 11/02 |
| 9,834,460 | B2* | 12/2017 | Nedwed | C02F 1/682 |
| 2012/0262618 | A1* | 10/2012 | Weakly | A45C 11/00 |
| | | | | 348/333.01 |
| 2013/0239869 | A1* | 9/2013 | Hesse | B63G 7/02 |
| | | | | 114/330 |
| 2013/0312296 | A1* | 11/2013 | Jones | E21C 45/00 |
| | | | | 37/317 |
| 2013/0314303 | A1 | 11/2013 | Osterhout et al. | |
| 2016/0096610 | A1* | 4/2016 | Suzuki | B63H 25/42 |
| | | | | 701/21 |
| 2016/0121989 | A1* | 5/2016 | Okuda | B63H 25/02 |
| | | | | 701/2 |
| 2016/0127716 | A1* | 5/2016 | Ramiro | G06F 1/163 |
| | | | | 348/53 |
| 2016/0298312 | A1* | 10/2016 | Heiler | E02F 3/8866 |
| 2017/0315548 | A1* | 11/2017 | Tisdall | G05D 1/0038 |

OTHER PUBLICATIONS

Alain Dinis et al., Human-Robot-Interfaces based on Mixed Reality for Underwater Robot Teleoperation, Sep. 2012 https://hal.archives-ouvertes.fr/hal-00761894/document (Year: 2012).*
Troy Turner, Scuba Smart-Goggles, Oct. 30, 2014, https://www.yankodesign.com/2014/10/30/scuba-smart-goggles/ (Year: 2014).*
Euronaval 2012 Show Daily News, Subsea Tech Guardian Exhibition, Oct. 30, 2012, https://www.navyrecognition.com/index.php/news/naval-exhibitions/2012-archive-naval-exhibitons/euronaval-2012/722-subsea-tech-exhibited-its-solutions-for-harbor-and-critical-infrastructures-underwater-surveillance.html (Year: 2012).*
International Search Report and Written Opinion dated Jul. 6, 2016 issued in corresponding application No. PCT/EP2016/055899; w/ English partial translation and partial machine translation (21 pages).
Yoshida, "Fundamentals of Underwater Vehicle Hardware and Their Applications", Ch. 29 in "Underwater Vehicles", Inzartsev, Ed., I-Tech, Vienna, Austria, pp. 557-582 (Dec. 2008), URL:http://www.intechopen.com/source/pdfs/6231/InTech-Fundamentals of underwater vehicle hardware and their applications.pdf (in English).
Teixeira et al., "Teleoperation Using Google Glass and AR.Drone for Structural Inspection", 2014 XVI Symposium on Virtual and Augmented Reality, IEEE, pp. 28-36, May 12, 2014 (in English).

* cited by examiner

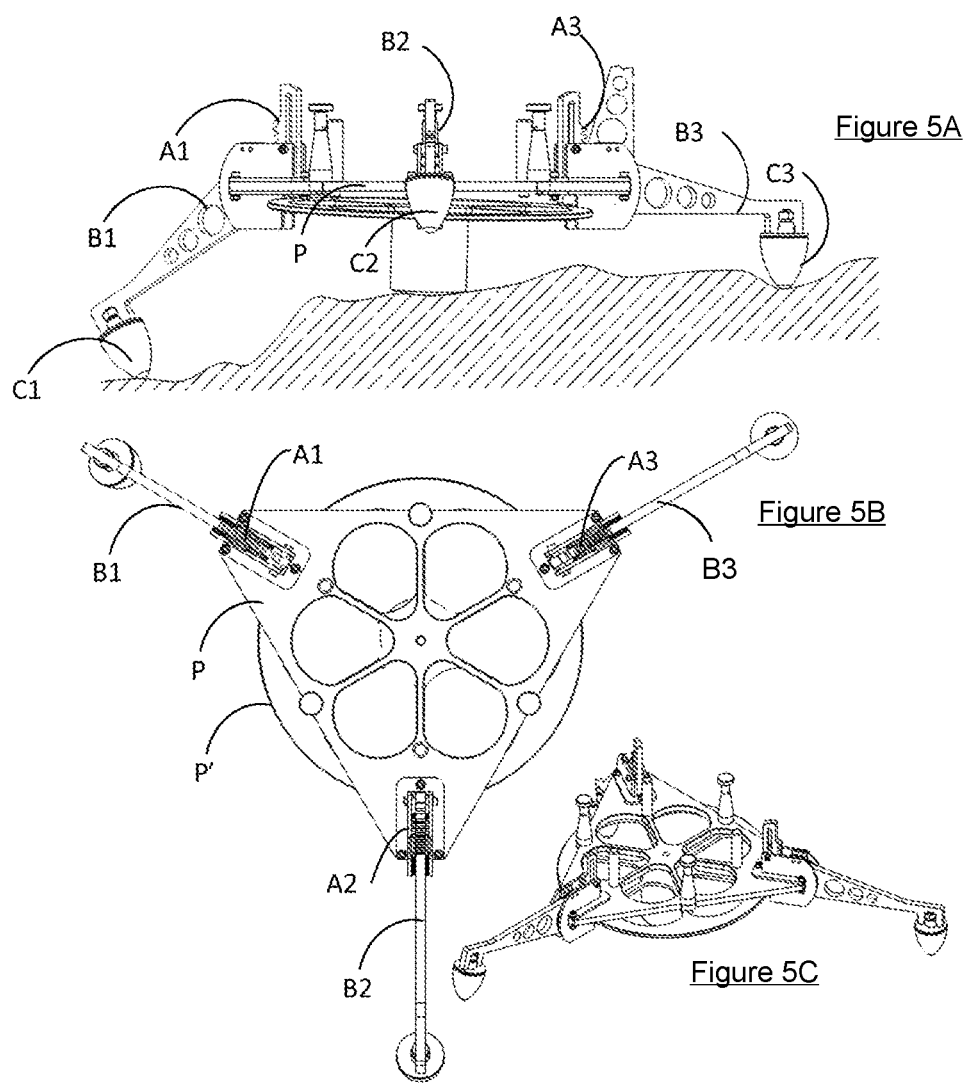

EQUIPMENT FOR ASSISTING UNDERWATER EXPLORATION AND UNDERWATER ROBOT FOR THE EQUIPMENT

FIELD OF THE INVENTION

The present invention concerns equipment for assisting underwater exploration and an underwater exploration robot for said equipment.

BACKGROUND ART

In the field of underwater archeology, archeologist divers devote themselves to exploring the undersea bottom, especially shipwrecks. These underwater archeology tasks are generally performed under difficult conditions, especially due to the constraints involved in the limited duration of the dives, the underwater environment and the presence of sediment on the bottom of the seas.

In order to assist or even replace a diver, archeological robots have been developed. One robot called "Speedy" has been developed in particular by the CNRS. This robot is outfitted with a three-digit hand able to manipulate fragile objects without breaking them. The robot hand is controlled from a command station located outside the water, which displays images of the hand taken by cameras on board the robot. By displaying these images, a pilot can control remotely the actions of the hand with the aid of a joystick.

SUMMARY OF THE INVENTION

The present invention proposes to further improve the situation.

For this purpose, the invention concerns equipment for assisting an underwater exploration, comprising an underwater robot and a remote control device for the robot, able to communicate with each other, in which
- the robot comprises means of underwater movement and an image capturing device;
- the control device comprises 3D glasses designed so that a user wearing the glasses views the underwater environment of the robot in three dimensions on the basis of images captured by the robot and means of remote guidance of the movement of the robot on the basis of the underwater environment visualized in three dimensions.

Thanks to the invention, the images captured by the robot, or drone, in situ (that is, at the site of the underwater exploration) make it possible to create and display or visualize a virtual underwater environment in three dimensions, representative of the actual underwater environment in three dimensions of the robot. The control device makes it possible to guide the robot in its actual environment by a guidance in this virtual environment in three dimensions, in other words, on the basis of the visualized environment in three dimensions. Thus, the movements of the robot are effectively controlled remotely.

Advantageously, the glasses are designed to guide the robot by head movements of the user wearing the glasses. Thus, the guidance of the robot is done by a movement of a portion of the body, in the present case the head, as a function of the perception which the user wearing the 3D glasses has of the 3D environment created.

In a first embodiment, the glasses are designed to be worn by a user situated outside the water.

In a second embodiment, the glasses are integrated in a diving mask and are designed to be worn by a diver user situated in the water.

According to a particular sample embodiment, the robot comprises a jet propulsion nozzle of pressurized water designed to clear away a zone.

Thanks to this, the robot can perform the work of clearing instead of a diver archeologist.

Advantageously, the robot comprises an aspiration pipe for deposits, especially sediments released by the water jet.

Again advantageously, the aspiration pipe is disposed concentrically around the propulsion nozzle.

The robot may comprise a pipe for evacuation of the aspirated deposits, having for example a length of at least 5 m, especially a length between 5 and 10 m.

Advantageously, the robot comprises a pipe for evacuation of the aspirated deposits.

In a particular embodiment, the evacuation pipe has a length of at least 5 m, especially a length between 5 and 10 m.

Advantageously, the evacuation pipe is provided with at least one filter designed to recover fragments of an object.

Again advantageously, the robot is provided with at least one adjustable antenna having a lighting device.

The robot may comprise a housing having a front face and a rear face and an annular sidewall. The annular sidewall may carry a plurality of motors, such as four motors, for driving the rotation of blades, such as orientable blades. These blades may be vertical blades (extending in length in the direction of the motor axle). The motors may be disposed symmetrically and set off from each other by an angle of 90°.

The robot may also comprise a removable water-tight cover, allowing for easy access to the elements contained in the housing.

In a particular embodiment, the robot is outfitted with a screen designed to visualize the images coming from the control device and/or the images captured by the image capturing device of the robot.

Advantageously, the robot is provided with a glass mounted tightly at one of the faces of the housing, behind which the screen is disposed.

The invention also concerns a robot for equipment assisting an underwater exploration, comprising
- means of underwater movement
- an image capturing device, designed to capture images adapted to creating an underwater environment in three dimensions for visualization;
- a communication device designed to transmit to a remote control device said images captured and to receive commands for guiding the movement in the created three-dimensional underwater environment.

The robot may comprise all or some of the following additional characteristics:
- the robot comprises a jet propulsion nozzle of pressurized water designed to clear away deposits, especially sediment, from a zone to be cleaned;
- the aspiration pipe is disposed concentrically around the propulsion nozzle;
- the robot comprises a pipe for evacuation of the aspirated deposits, having a length of at least 5 m, especially a length between 5 and 10 m;
- the evacuation pipe is provided with at least one filter designed to recover fragments of an object;
- the robot is provided with at least one adjustable antenna having a lighting device;
- it comprises a housing having a front face, a rear face and an annular sidewall;

the sidewall carries a plurality of motors, such as four motors, for driving the rotation of blades, such as orientable blades;

the four motors are disposed symmetrically and set off from each other by an angle of 90°;

the robot comprises a removable water-tight cover;

the robot is outfitted with a screen designed to visualize the images coming from the control device and/or the images captured by the image capturing device;

the robot is provided with a glass mounted tightly at one of the faces of the housing, behind which the screen is disposed.

BRIEF DESCRIPTION OF THE DRAWINGS

The invention will be better understood with the aid of the following description of a particular embodiment of the equipment for assistance of an underwater exploration according to the invention, making reference to the enclosed drawings, in which

FIGS. 5A to 5D represent a positioning system of a central robot, according to a particular embodiment;

DETAILED DESCRIPTION OF PARTICULAR EMBODIMENTS

Figure 1:
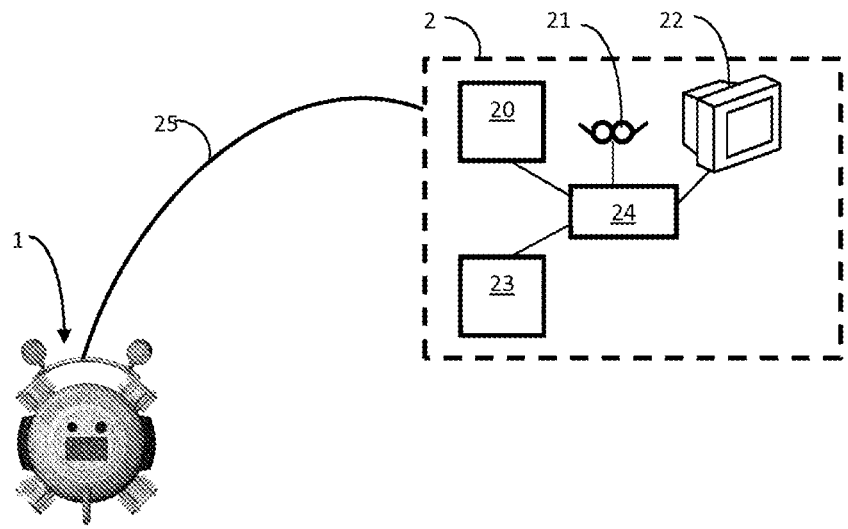
FIG. 1 shows schematically the equipment for assistance of an underwater exploration, according to a particular embodiment of the invention.

In FIG. 1 there is shown schematically equipment for assisting an underwater exploration, according to a particular sample embodiment of the invention. The equipment comprises an underwater robot 1, likewise known as a "working or prospecting robot", and a remote control device 2 for the robot 1. The robot 1 and the control device 2 are able to communicate with each other. In the example described here, they communicate by wired means, using a data communication cable.

Figure 2:
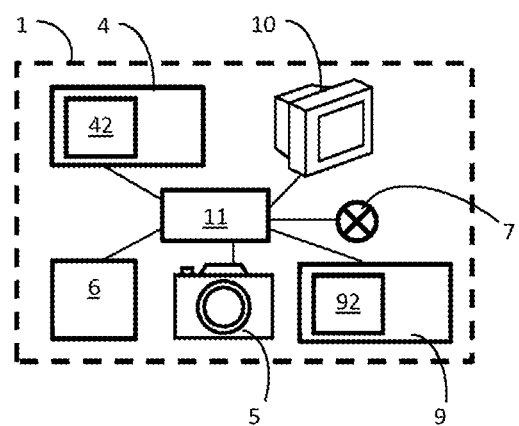
FIG. 2 shows schematically an underwater robot for the equipment of FIG. 1.
Figure 3A:
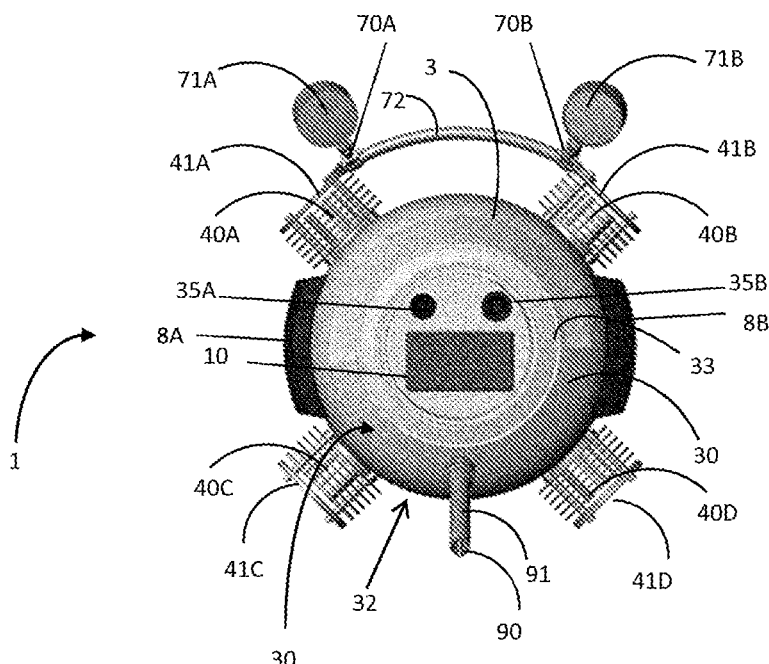
FIG. 3A represents a front view of a robot for underwater exploration of the equipment of FIG. 1.
Figure 3B:
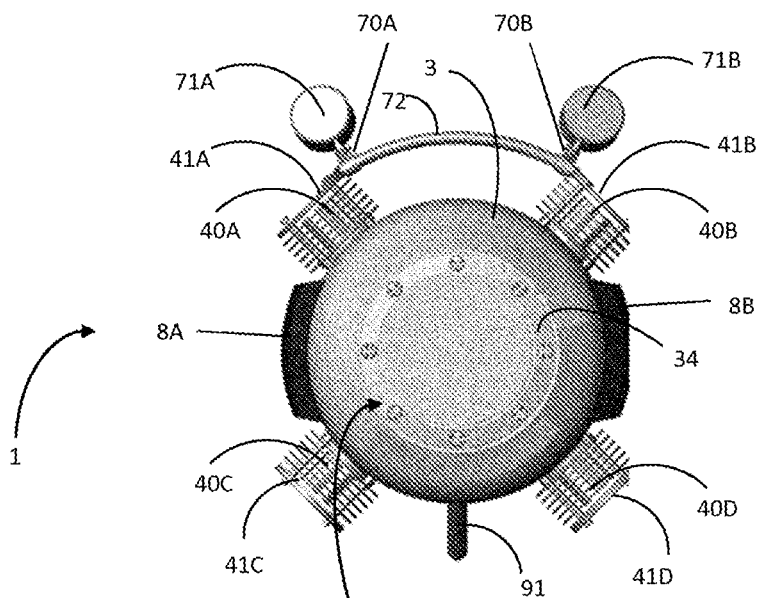
FIG. 3B represents a rear view of the robot of FIG. 2.
Figure 4:
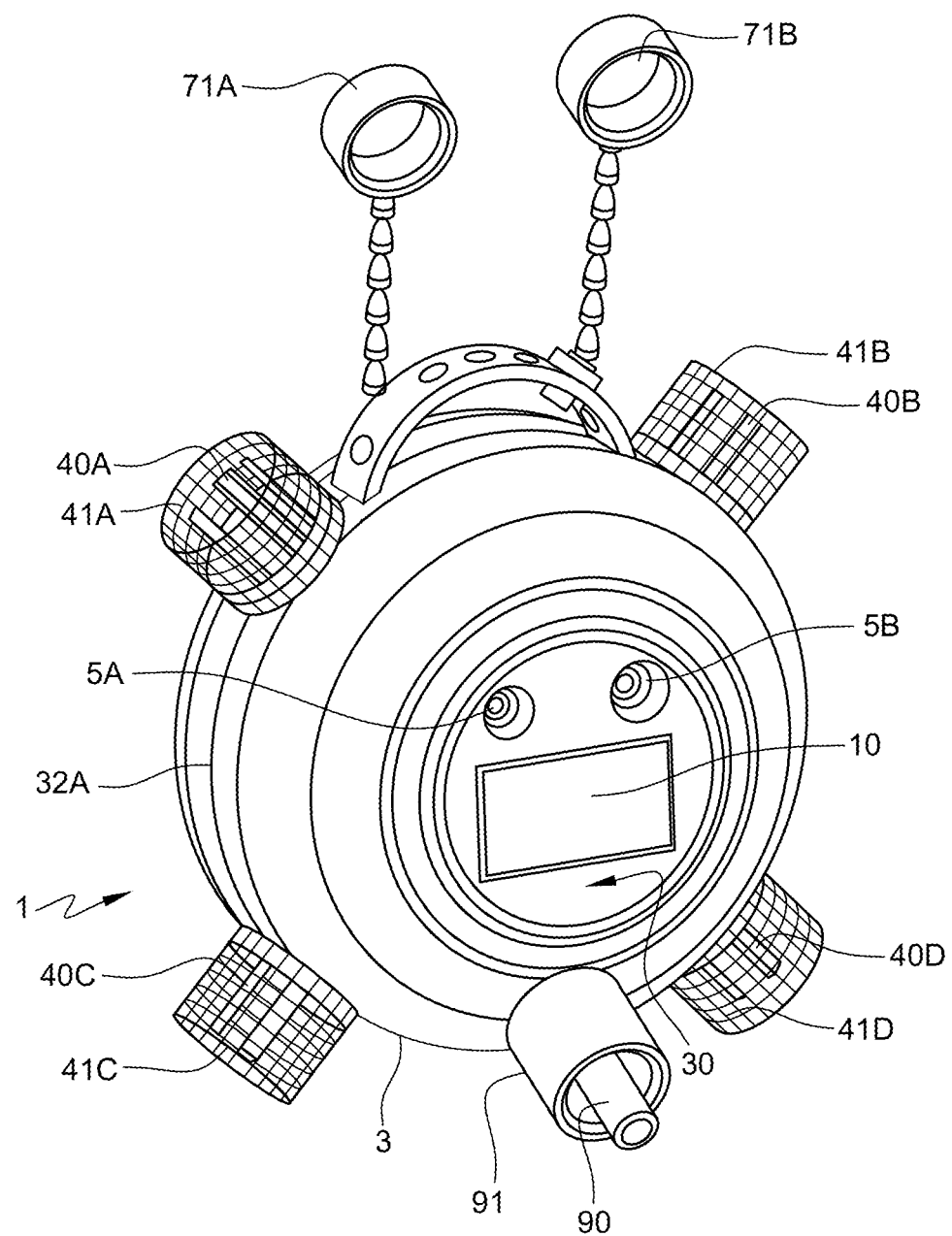
FIG. 4 represents a three dimensional view, on the front face side, of the robot.

The different elements of the robot are represented schematically in FIG. 2. FIGS. 3A and 3B show respectively a front view and a rear view of the robot 1, according to a first sample embodiment. FIG. 4 shows a perspective view of the robot 1, according to a second sample embodiment, differing from that of FIGS. 3A and 3B basically in aesthetic characteristics. The identical or corresponding elements represented in the different figures carry the same references.

The underwater robot 1, or underwater drone, comprises a housing 3, means of underwater movement 4, an image capturing device 5, a communication module 6, and a central command unit 11.

In the particular embodiment described here, the housing 3 comprises two front 30 and rear 31 faces, joined by a sidewall 32. The front face 30 here comprises a glass (not shown in FIG. 2) of transparent material and circular shape, mounted tightly in a seat 33 devised in the housing 3. The seat 33 is formed by an annular flange of the housing 3, recessed in regard to the plane of the front face 30. The rear face 31 comprises a removable and tight cover 34. This cover 34 is of circular shape here (for example, the same shape as the glass 30). It is mounted tightly in a seat similar to the seat 33 devised in the rear face of the housing 3. It is secured removably by screw fastening, with the aid of a plurality of screws arranged about the perimeter of the cover 34. The screws are in a regular distribution. In the sample embodiment represented in FIG. 3, the cover 34 is secured by means of eight screws set off from each other by an angle of 45°. The cover 34 can be removed when the robot is located outside of the water, in order to gain access to the elements contained on the inside of the housing 3. The sidewall 32 comprises an annular cylindrical portion joined to the two front 30 and rear 31 faces by annular, outwardly convex portions, so as to join the annular cylindrical portion of the sidewall 32 to the front 30 and rear 31 faces.

The means of movement 4 of the robot 1 comprise at least one driving motor, designed to drive the rotation of blades. The blades here are "vertical". In other words, they form an assembly of the Voith Schneider type. The blades have a bearing surface (for example, one of generally rectangular shape) designed to be driven in rotation about a motor axle which extends in length along the motor axle. The rotational blades here are orientable in angle. As a result, they may play the part of a rudder to direct the robot in its movement. The number of blades per motor may be between 4 and 6. In the example described here, the robot 1 comprises four motors with orientable vertical blades 40A to 40D disposed around the annular cylindrical portion of the sidewall 32. The four motors 40A to 40D are arranged at regular spacing around the housing 3. They are set off from one another by an angle of 90°. Each motor 40A-40D here is surrounded by a grille 41A-41D for protection of the blades, for example, of cylindrical shape. Moreover, the means of movement 4 comprise a command module 42 designed to command the operation of the motors 40A to 40D and their blades. The command module 42 is designed to receive guidance commands coming from the remote control device 2, as shall be explained further below. However, one could use motors of any given type, in particular motors of propeller type.

The image capturing device 5 here comprises two 3D cameras, referenced 5A and 5B, disposed inside the housing 3, to the right of through openings 35A, 35B devised in the bottom of the seat 33 of the front face 30. It is designed to capture images adapted to creating an underwater three-dimensional environment to be visualized.

The communication module 6 of the robot 1 (not shown) is designed to communicate with the control device 2, here by wired connection, through a data communication cable 26. It is integrated in the housing 3.

In the sample embodiment described here, the robot 1 likewise comprises a display screen 10. This is disposed on the side with the front face 30, in the seat 33, behind the glass, here beneath the two openings 35A, 35B. It is designed to display images taken by the cameras 5A, 5B and/or images coming from the control device 2, as shall be explained further below.

In one variant embodiment, the screen 10 is of touch type. In this case, the screen 10 is glued against the internal face of the glass of the front face 30 of the robot 1 such that the glass covers the screen 10. The glass is made of a material adapted to allowing the use of the touch screen 10.

The screen 10 may be used to communicate with a diver accompanying the robot 1. For example, a user of the control device 2 could communicate with the diver by means of the screen 10.

The robot 1 may be outfitted with lighting means 7 comprising here two adjustable antennas 70A, 70B each one having a lighting device 71A, 71B, such as a light projector, designed to illuminate the marine bottom. The antennas 70A, 70B are adjustable in the sense that their shape and/or their position can be regulated, here, manually. For example, the antennas 70A, 70B can be made of a shape-memory material or structure. They enable a manual orienting of the projectors. The two antenna/projector assemblies are mounted on a bar 72, in the shape of a circle arc. The bar 72 is secured for example to the upper protection grilles 41A and 41B.

The robot 1 is likewise provided here with ballast elements, in the present case two elements 8A, 8B (not represented in FIG. 4). These are carried by the sidewall 32, for example, by the annular cylindrical portion of the sidewall 32. They are disposed for example between the upper motors 40A, 40B and the lower motors 40C, 40D.

The robot 1 here is outfitted with a clearing tool 9. This clearing tool 9 comprises a jet propulsion nozzle 90 of pressurized water designed to clear away deposits, especially sediment, from a zone being cleared. The nozzle 90 comprises a pipe having for example a length of around 30 cm. This is connected to a pump (not shown) situated inside the housing 3 and designed to produce a jet of water at a pressure here greater than 2 bars. The pump is supplied with water by a water intake inlet, designed to aspirate water when the robot 1 is immersed in water. The inlet is provided with a filter designed to prevent the aspiration of detritus or other elements of material.

In the sample embodiment described here, the clearing tool 9 likewise comprises an aspiration pipe 91 designed to aspirate the deposits, especially sediments, released by the water jet. The aspiration pipe 91 is connected to a pump (not shown) situated inside the housing 3. The pipe 91 is disposed concentrically about the water jet propulsion nozzle 90. It is connected to another evacuation pipe (not shown), or extension pipe, designed to throw out the water and the aspirated elements of material (especially sediments) further away. The evacuation pipe is preferably a flexible pipe, made of resilient material, which extends for example behind the robot for a length between 5 and 10 m. For example, it projects from the rear face 31 of the robot, in the bottom of the latter, to the right or approximately to the right of the aspiration pipe 91. The end of the evacuation pipe may be equipped with a filter designed to recover small objects or fragments of an object which will be sorted out by archeologists outside of the water. However, the evacuation pipe is optional. The evacuation could be done through an opening, for example, at the rear of the housing, without an extension pipe.

The evacuation pipe may be connected to a collection bag for the aspirated elements (sediments, small objects or fragments of an object, or other elements). The collection bag is preferably water permeable. It is advantageously made of woven textile having a filtering function: the size of the textile mesh is adapted to let through sediments to the outside of the bag yet retain small objects collected on the inside of the bag. The size of the mesh defines a filtering threshold with respect to the size of the elements filtered.

The clearing tool 9 likewise comprises a command module 92 designed to control the operation of the propulsion nozzle 90 and the aspiration pipe 91.

In the particular sample embodiment described here, a metallic cable enables the mechanical connection of the robot to a ship on the surface. One of the ends of the cable for example is hooked to the bar 72 and the other end is lashed to an element located on the ship, such as a winch enabling the winding and unwinding of the cable.

The robot 1 is connected to the ship by two other cables: an electrical power supply cable with a low-voltage current (25 V maximum) and the data communication cable. The three cables (mechanical connection cable, electrical cable, and communication cable) may be coaxial and form a single cable referenced as 26 in FIG. 1.

The central command unit 11 of the robot 1 comprises a microprocessor to which the following elements are connected: communication module 6, screen 10, command module 42 for the movement driving means 4, lighting device 7, command module 92 for the clearing tool 9.

The remote control device 2 of the robot 1 is located for example on the ship. It comprises a communication module 20, a pair of 3D glasses 21, a display screen 22, a 3D display module 23, a remote guidance module 24 for the robot and a central command unit 25, in the present instance a processor.

The communication module 20 is designed to communicate with the robot 1, here, by wired means, through the data communication cable. It allows receiving data transmitted by the robot 1, especially images captured by the cameras 5A, 5B. It also makes it possible to transmit to the robot 1 guidance commands for guiding the robot 1 during its movements.

The 3D glasses are designed so that a user wearing the glasses can visualize on the screen 22 the underwater environment of the robot in three dimensions on the basis of the images captured by the robot 1 and transmitted to the control device 2. The 3D display module 23 is designed to generate images in three dimensions and to create a virtual underwater environment in three dimensions which is representative of the actual underwater environment of the robot 1, on the basis of images captured and transmitted by the robot 1. This virtual 3D environment which is created is displayed on the screen 22.

Moreover, the 3D glasses are equipped with a module for detection of head movements of the user wearing the glasses and a module for guidance of the robot on the basis of the head movements so detected.

The guidance module 24 comprises here a control joystick, connected to the central unit 25, and a driver of the joystick designed to translate the movements of the joystick into guidance commands intended for the robot 1.

The guidance commands of the robot, which may be generated by the guidance module 24 and/or by the 3D glasses, are designed to guide the movements of the robot in its actual underwater environment. They are generated on the basis of the virtual environment created in three dimensions. For example, the head movements of the user wearing the 3D glasses make it possible to orient the robot, while a joystick operated by the user makes it possible for the robot 1 to move forward, move backward, move up or move down. The guidance commands may in particular control the orientation of the rotational blades of the motors 40A-40D.

One could contemplate integrating a display screen in the 3D glasses (in place or as a supplement to the screen 22 of the control device 2). In this case, the 3D glasses are virtual reality glasses. For example, it may be glasses of the type "Oculus Rift™". Moreover, the glasses could be integrated in a diver's mask and be worn by a diver so as to allow him to guide the movements of robot 1 in situ (that is, on site in the water, at the underwater exploration site).

We shall now describe the operation of the equipment for assistance of underwater exploration.

In operation, during an underwater exploration, the robot 1 is submerged in water and moves up to the exploration zone, such as a shipwreck situated on the sea bottom. It is connected to the ship by the cable 25.

The robot 1 takes images of its environment with the aid of the cameras 5A, 5B. The images are transmitted to the control device 2 located on the ship.

The control device 2 generates 3D images and creates a "virtual" underwater environment in three dimensions which is representative of the actual environment of the robot 1, on the basis of images captured and transmitted by the robot 1.

The robot 1 is guided in its movements by an operator situated at the control station 2. The operator wears the 3D vision and guidance glasses 21. He views on the screen 22, in three dimensions, the underwater environment of the robot created on the basis of the images captured by the robot.

With the help of the command joystick and/or head movements, the operator guides the robot 1 in its movements. Guidance commands are transmitted by the control station 2 to the robot 1, which executes them. These guidance commands are intended to guide the robot 1 in its actual environment on the basis of a guidance in the virtual three-dimensional underwater environment created and visualized on the screen 22.

During the exploration, the robot 1 is positioned in proximity to a zone which is to be cleared. On command of the operator, via the guidance station, the robot 1 propels a jet of pressurized water onto the zone being cleared with the aid of the nozzle 90 and, at the same time, aspirates at least partly the sediments released with the help of the concentric pipe 91. The sediments so aspirated are then thrown further away by the evacuation pipe.

In the sample embodiment just described, the robot 1 is equipped with a clearing tool which comprises a water jet propulsion nozzle 90, an aspiration pipe 91 and an evacuation pipe. The robot 1 could be outfitted with another underwater exploration tool (clearing tool, grabbing or grasping tool for seizing an object, sampling tool, for example to take samples of material for analysis, etc.).

The tools of the robot could be interchangeable. Each tool could be mounted in removable fashion on the same attachment site, or tool holder, of the robot.

Instead of a 3D guidance, the robot could employ a 2D guidance, in particular on the basis of 2D images captured by the robot.

In the preceding description of a particular sample embodiment, the robot 1 is connected to the ship by a mechanical cable, a data communication cable and an electrical power supply cable, which are intended respectively to provide for the physical linkage, the transmission of communication data, and the electrical power supply between the ship and/or the control device 2 and the robot 1. In variants, one could contemplate eliminating or at least not utilizing all or some of these cables.

According to a first variant embodiment, the robot is not connected physically to the ship by a mechanical cable. In this case, the robot 1 is physically autonomous. However, one could provide a physical connection cable to a diver accompanying the robot 1 during the dive, in order to limit the risk of losing the robot.

According to a second variant embodiment, the robot is not connected to an electrical power supply located on the ship by an electrical power supply cable. In this case, the robot integrates an electrical power supply battery. This battery is advantageously rechargeable, for example, at an electrical power supply terminal. This recharging terminal could be located on the ship and/or on land.

According to a third variant embodiment, the robot is not connected to the control device 2 by a data transmission cable. In this case, the robot integrates a wireless communication module adapted to communicate with a corresponding module of the control device.

According to a fourth variant embodiment, the robot does not communicate with the control device 2 during the dive. In this case, the robot is not connected to the control device 2 by a data transmission cable and does not integrate a wireless communication module with the control device 2. The robot may integrate means of data storage memory, such as an internal memory enabling a later data transfer and/or a removable data storage memory card. The communication module of the robot is thus optional. We note that, in this case, the guidance of the robot, especially the orientation of the blades of the driving motors, could be controlled by a control loop implemented by an autonomous control module of the robot.

Some or all of the different variant embodiments just described may be combined.

In general, the robot may integrate data storage memory means (for example, internal memory allowing a later data transfer or a removable data storage memory card).

Once out of the water, the robot may be parked at a receiving station. This may comprise a chamber designed to receive the robot. A reel may also be provided for winding up the cable or cables of the robot. The receiving station may be mounted on a transport pallet. The chamber may advantageously be devised inside the reel. The receiving station may likewise comprise a movable tray, such as a sliding tray, to support the robot. The tray can be mounted movably between a first closed or parked position in which the robot is placed in its chamber and a second open or exit position in which the robot may exit from the receiving station.

The working robot 1 may be outfitted with a metal detector designed for underwater detection. For example, the metal detector may be the detector E-TRAC© manufactured by the company MINELAB. Such a detector has the following advantages:

it is able to work at multiple frequencies from 1.5 kHz to 100 kHz, providing a great analysis precision;
  it can download detection programs from a computer, via a USB socket;
  it enables a graphic interpretation of a target detected on a screen;
  it can determine the nature of a target detected.

The metal detector comprises a detection ring. This is advantageously disposed around the water jet propulsion nozzle 90 in concentric manner. The nozzle 90 is thus disposed at the center of the detection ring.

The visualization module 23 of the control device 2 may in this case be arranged to incorporate in the 3D virtual representation of the underwater environment generated on the basis of images captured by the robot 1 information allowing an identification and/or referencing of zones in which the metallic elements have been detected. The fact of knowing the location of metallic elements detected enables archeologists to deduce useful information from this regarding an archeological prospecting site, such as the orientation and/or the position of a vessel.

The working robot 1 may be adapted to actuate the water jet propulsion nozzle 90 autonomously, upon detection of a metallic element, in order to clear it out. For this purpose, the command module 92 of the jet propulsion nozzle 90 for pressurized water is designed to command automatically, or on command from a pilot, the propulsion of a jet of pressurized water upon detection of a metallic element so as to clear away said detected metallic element Thanks to this, the robot only clears away the sediments covering a detected metallic element, autonomously, in particular without the intervention of a diver and without a pilot.

The working robot 1 may furthermore be outfitted with a voltmeter/ammeter designed to analyze by volt/amperometry the elements which are aspirated, particularly the sediments, after detection of a metal by the metal detector. This apparatus is advantageously integrated inside the robot 1. Since the robot 1 is provided with a system for aspiration of sediments and this flow moves inside the robot, the volt/amperometry apparatus is installed in an elbow of the sediment conduit. It performs a measurement of "electrochemical" type, based on a variation in the electrical potential of the solution being checked, which is a sample taken inside the drone from the movement of water laden with sediment. The analysis of the sample (sediment, water, etc.) by volt/amperometry makes it possible to confirm whether a detected piece is metal or instead of a different material (such as earthenware), by a measurement of the ion concentrations contained in the sample being analyzed. The apparatus for analysis by volt/amperometry is, for example, the apparatus referenced as 910 PSTAT mini, manufactured by the company Metrohm. It has the ability to measure the ion concentrations contained in the sediments or other elements aspirated. In particular, it is able to detect the presence of metals such as copper, lead, platinum, zinc, iron, mercury, etc. The analysis by volt/amperometry of the elements aspirated by the aspiration pipe 91 of the working robot 1 makes it possible to obtain additional information, supplementing the metal detection information provided by the metal detector. This dual information as to the nature of the underwater floor enables profitable use of the prospecting time and to only perform a clearing operation (by removal of the sediment) by the working robot 1 in places where the metal detector has detected the presence of metal or, in parallel, where the volt/amperometry apparatus has likewise detected the presence of traces of metal in the sediment or other elements aspirated.

Figure 9:
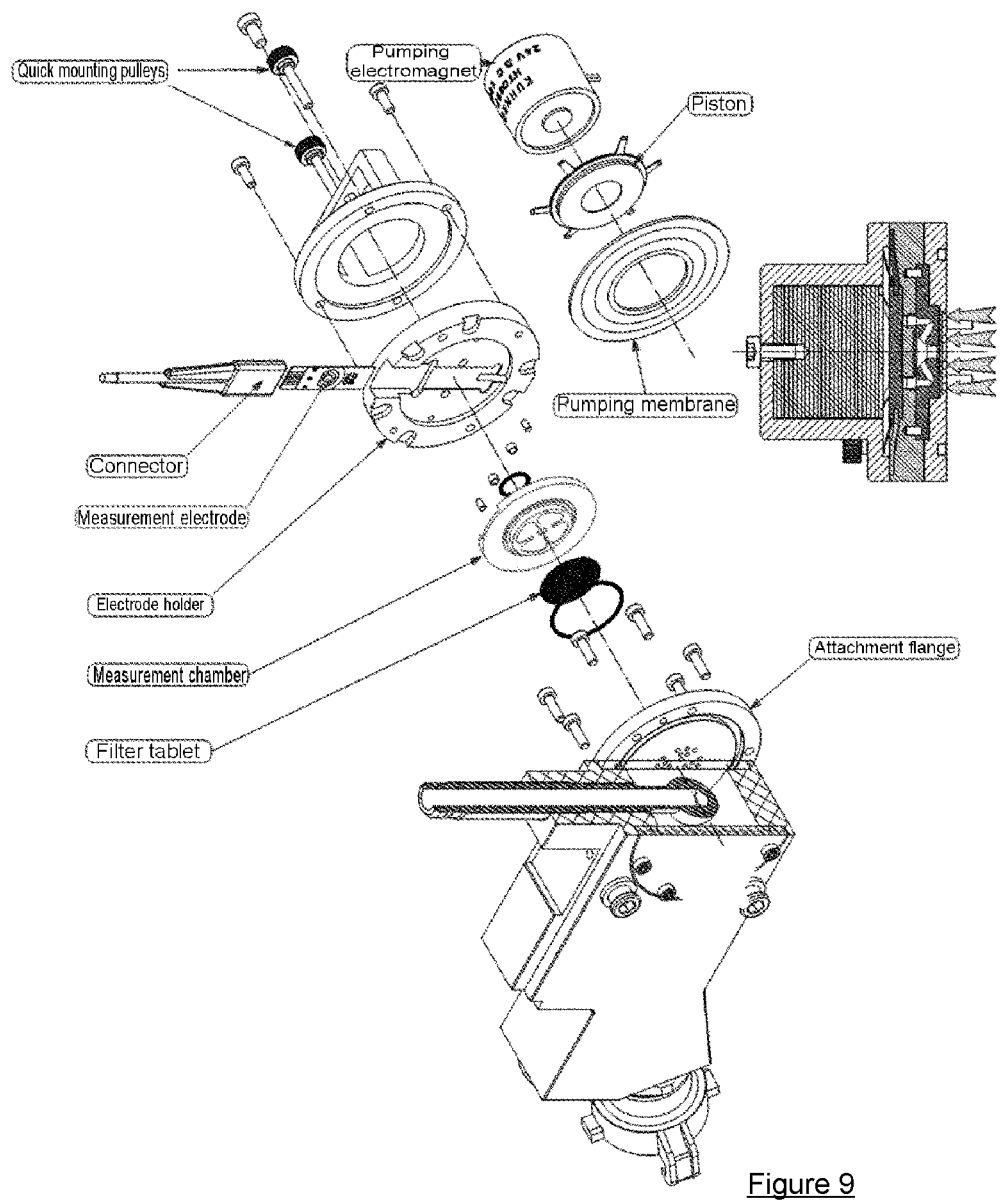
FIG. 9 represents an example of the integration of a voltmeter and ammeter in a working robot 1.

FIG. 9 represents the integration of part of the apparatus 910 PSTAT mini in a working robot 1. An attachment flange is integrated with the elbow present in the robot in the place where the sediment-laden water passes and a volt/amperometric measurement cell is mounted concentrically to this flange and integrated with it. A pumping electromagnet, a piston and a pumping membrane are situated behind an electrode holder and when the piston is actuated by the electromagnet, the pumping membrane samples the solution being analyzed, or the specimen, in the passage of sediment-laden water. The specimen solution passes through a filter tablet before making contact with a measuring electrode lodged in the electrode holder and a connector is attached to the measurement electrode, guaranteeing the connection to the apparatus 910 PSTAT mini located inside the robot.

The pumping electromagnet keeps the piston in its "armed" position, that is, in the final position of its aspiration travel. The piston remains in this position for as long as the electromagnet is under voltage. When the electromagnet no longer receives any current, a membrane return spring releases its force to push the liquid analyzed out from the measurement chamber and into the sediment passage. The volume of liquid sampled is more than ten times greater than the quantity of liquid analyzed in contact with the measurement electrode. Of course, there always remains a bit of liquid from the previous measurement each time that a dose for analysis is sampled by means of the piston controlled by the electromagnet, but this "polluted" volume from the preceding measurement represents less than 10% of the new volume of water analyzed. Thus, if there are traces of a pollutant in nonpolluted samples, it will be present at least ten times less than in the preceding measurement and since the number of measurements is very large, the polluted volume will be divided by ten each time. Thus, in case of doubt and to guarantee a certain reliability, one measurement method involves for example measuring the sediments coming from the same place of the prospecting site three times and giving more weight to the last two measurements than to the first.

A working robot could also be outfitted with a radioactivity detector.

A plurality of working robots similar to the previously described robot 1 may work together at the same prospecting zone of an archeological site. For example, two working robots can work facing each other and direct their respective jets of pressurized water toward the same location.

A plurality of working robots (similar to the previously described robot 1) making up a working or prospecting group may be connected to a central robot (or base station). This central robot is advantageously placed bearing against the sea floor, which gives it good stability.

The central robot may integrate a common central pump, to which the working robots are connected by their respective evacuation pipes, acting as connection pipes. During operation, each working robot can project a jet of pressurized water onto a work zone or prospecting zone covered by this robot and aspirate sediment under the action of aspiration of the common central pump. The sediment aspirated by the different working robots is then transported to the central robot by means of the respective connection pipes. At the central robot, the aspirated sediment received from different working robots is distributed into different respective collection bags (respectively assigned to the different working robots). Thus, the sediment aspirated by a given working robot is recovered in the collection bag associated with that robot. Hence, even if several working robots are operating at a site and are all connected to the central drone containing the sediment aspiration pump running up to the nozzle of each working drone, a single sediment bag will be filled by each robot.

The collection bags are preferably water permeable. They are advantageously made of a woven textile having a mesh width adapted to let through the sediment, but retain inside the bag the aspirated elements of larger size. The collection bags may have a collection capacity for example between 150 kg and 250 kg. They may be left temporarily at the archeological site or be brought back to the surface for example by means of reascent balloons or a hauling cable.

Each collection bag may have an identification element. For example, it may carry a bar code, a QR code (two-dimensional bar code), or any other identifier. This identification element is associated with the work zone or prospecting zone covered by the robot assigned to this bag. This makes it possible to identify the location where an aspirated element (such as a mosaic or a fragment of an object) was found.

Each collection bag is connected to the central robot by a connection pipe integrated at one of its ends in the central robot and designed to be connected by its other end to an entry opening of the collection bag through a connection device. This connection device advantageously allows connecting the connection pipe to the bag in tight manner and with a semi-automatic positioning. The operation of connection between the connection pipe and the collection bag may thus be performed by a working robot, without the need for great precision of movement. For example, the connection device uses magnetic elements making it possible to produce a tight connection and facilitating the relative positioning and the connecting of the connection end of the pipe and the opening of the bag. The connection device is advantageously adapted to disconnect the bag and the connection pipe automatically (that is, without the intervention of an operator or a diver) when the bag is brought back to the surface (by a hauling cable or by a balloon).

The central robot may be outfitted with a lighting device similar to that of a working robot 1, as described above. This lighting device may be oriented in adjustable manner, either "manually" by a diver or by a working robot, or in automated manner by means of a motor which can be remote controlled by an operator located at the surface.

Figure 5D:
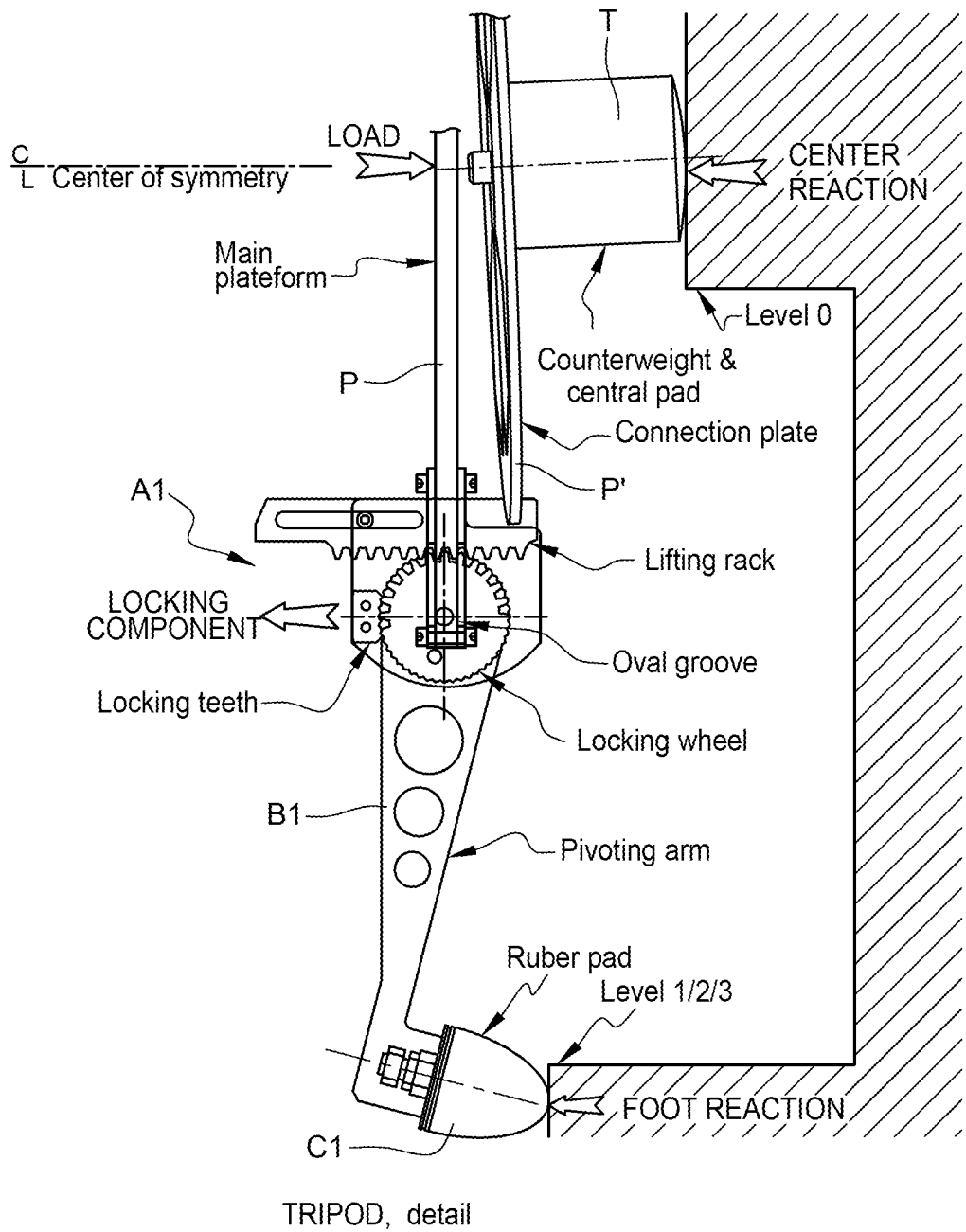

The central robot is advantageously equipped with a positioning system, comprising three positioning arms B1, B2, B3, also known as a "tripod", allowing the central robot to set down on an irregular or greatly sloping sea floor, as represented in FIGS. 5A to 5D. This positioning system is autonomous and works only by gravity and by contact with the ground. The three arms B1 to B3 are mounted pivoting on a plate P by means of respective snap fastening or toothed rack systems A1, A2, A3, as represented in FIGS. 5A to 5C. The plate P is meant to be positioned horizontally when the central robot is in a position of stable support against the sea floor. Initially, at the time of the dive, the robot has its three arms in a top vertical position, that is, all three of them are in a vertical waiting position and ready to drop toward the ground when the "belly" of the robot makes contact with the sea floor. The action of the weight of the robot when it is placed on the ground causes the plate P to release the 3 arms B1 to B3 so that they drop and pivot around their axes until the ends of the arms, provided with support pads C1, C2, C3, made of rubber for example, make contact individually with the ground. The snap fastening systems around the axes A1-A3 lock the arms B1-B3 in their position of contact with the ground, thus rigidifying the assemblage of the arms B1-B3 and the plate P in a horizontal position parallel to the body of water. When the robot is raised, the weight releases the plate P and the arms B1 to B3 are unlocked. Under the action of gravity and the unbalanced state relative to their axis of rotation or pivoting, the arms B1 to B3 reposition themselves vertically. It should be emphasized that this system works in autonomous manner, that is, without a motor or electronics, without electricity, and without springs, so as to avoid any malfunctioning and especially to reduce the electrical contacts to the outside of the robot.

The central robot may be equipped with an image capturing device, such as a camera, disposed beneath the robot and designed to take images below the robot to check for the possible presence of fragile objects on the ground in the area where the robot is touching down, before setting down the robot, thus preventing their damaging by the robot.

FIG. 5A represents the positioning system of the central robot set down on irregular ground and the adaptation of the system of positioning arms to the ground while maintaining the base platform or plate P as close to the horizontal as possible, that is, as parallel as possible to the body of water. This helps guarantee a good stability of the main robot, its proper functioning and the proper positioning of the various connections to this main robot.

FIGS. 5B and 5C represent the system of positioning of the central robot in top view and perspective view.

FIG. 5D shows details of the articulation of one of the arms B1-B3 of the tripod or positioning system. Of course, the three arms B1 to B3 are analogous.

The plate P or "main platform" has the purpose of remaining as parallel as possible to the body of water, that is, to the horizontal. Beneath it, the system comprises a connection plate P' to which is attached, at its center, a counterweight and central pad element T. When the main robot equipped with its tripod is in its descent phase in the water, the three pivoting arms B1 to B3 are in the raised position and the connection plate is at the bottom of its travel, parallel to the main platform P. The connection plate P' drives the lifting racks which are in their lowest position at the time of the descent. When the robot makes contact with the ground, the robot slows down and a pilot observes, via the camera which investigates the ground, the point of contact so as not to set the main robot down on possible artifacts or fragile objects. Once the landing site is validated, the descent of the assembly continues, and then the counterweight and central pad element T is the first to make contact with the ground. This immediately transmits a vertical movement via its connection plate P' to the three racks A1-A3, while the main platform on which the entire load of the main drone is placed continues to descend, at the same time lowering the three axes of rotation of the arms, pivoting in an oval groove. The more the distance between the main platform P and the connection plate P' decreases, the closer the end of the three arms comes to the ground. The pivoting of the arms B1 to B3 continues until the respective ends of the arms C1 to C3, containing rubber pads, sink slightly into the ground. At this moment, the main platform or plate P continues to descend and positions the pivoting of the arm at the top of the oval groove, which has the effect of positioning a ratchet wheel (locking wheel) in a toothed locking block. Thus, the three arms B1 to B3 have come to the end of their travel in search of a contact with the ground, so that the tripod or positioning system is set down on the ground. The result is a main platform P which remains horizontal and a connection plate P' which is inclined according to the terrain. When there is no further movement, the weight of the whole pushes the main platform against the arm and thus brings about the positioning of the three locking wheels in the toothed locking blocks.

It is only when a hauling cable pulls on the drone to bring it up to the surface that the pivoting points of the three arms once more drop to the bottom of the oval groove and, under the action of gravity, the counterweight by way of the connection plate P' pulls the racks downward and drives via their teeth the three arms to reposition themselves vertically into the "raised position".

Depending on the ground (its level and hardness), it is possible to carry out several landing attempts at the same site until finding an ideal working position. It is also desirable to move several dozen meters, each time having a different orientation of the arms, since it is not necessarily a question of trying to set down the main robot on a mere slope, but rather anticipating that this slope might also contain craters.

This "tripod" positioning system is thus auto-adapted to the terrain profile without having to be brought back to the surface and without needing the involvement of a diver.

One purpose being to reduce the risks associated with a dive at great depth and to optimize the preliminary work of the archeologist divers, it is thus absolutely advantageous that the pilot of the robot can always work without the assistance of divers.

The central robot (or the base station) having a fixed position, it may serve as a geographical pinpoint (or reference) for the working robots. For this purpose, the central robot may be outfitted with an optical source of light emission constituting an optical reference point for the working robots. Each working robot has an internal geographical location reference defined by a reference point constituting the origin of the reference system and three preferably orthonormalized axes. In operation, when a working robot wishes to adjust and/or verify the origin of its geographical location reference system, it approaches the optical source of the central robot, detects it, and fixes the origin of its location reference system at the detected optical source. The use of such an optical location technique makes it possible to not disturb the surrounding marine fauna.

Each working robot 1 may likewise integrate an unblocking system designed to clear at least one of the two pipes (aspiration pipe or evacuation pipe) in event of its obstruction by a plug formed of aspirated elements (such as agglomerations of algae, pebbles, etc.). The unblocking system comprises at least one tank of compressed air designed to send compressed air into the pipes (aspiration and evacuation). The air under pressure is sent to the sediment aspiration, that is, to the place where the working robot is aspirating sediment, and in the direction of the central robot containing the pump common to all the other working robots. Two tanks may be provided for space considerations. The compressed air under pressure entering a pipe is intended to unblock the pipe, in other words, to evacuate a plug having formed in the pipe and obstructing it. The pressure of the compressed air released into the pipe should be greater than the pressure exerted by the liquid laden with sediment (and possibly other elements) on the plug when the pipe is blocked. The unblocking system may be actuated by a diver located near the robot or by an operator located at a distance (on the surface), in which case an actuating command is sent by the control device to the robot by a communication path 25.

Figure 8:
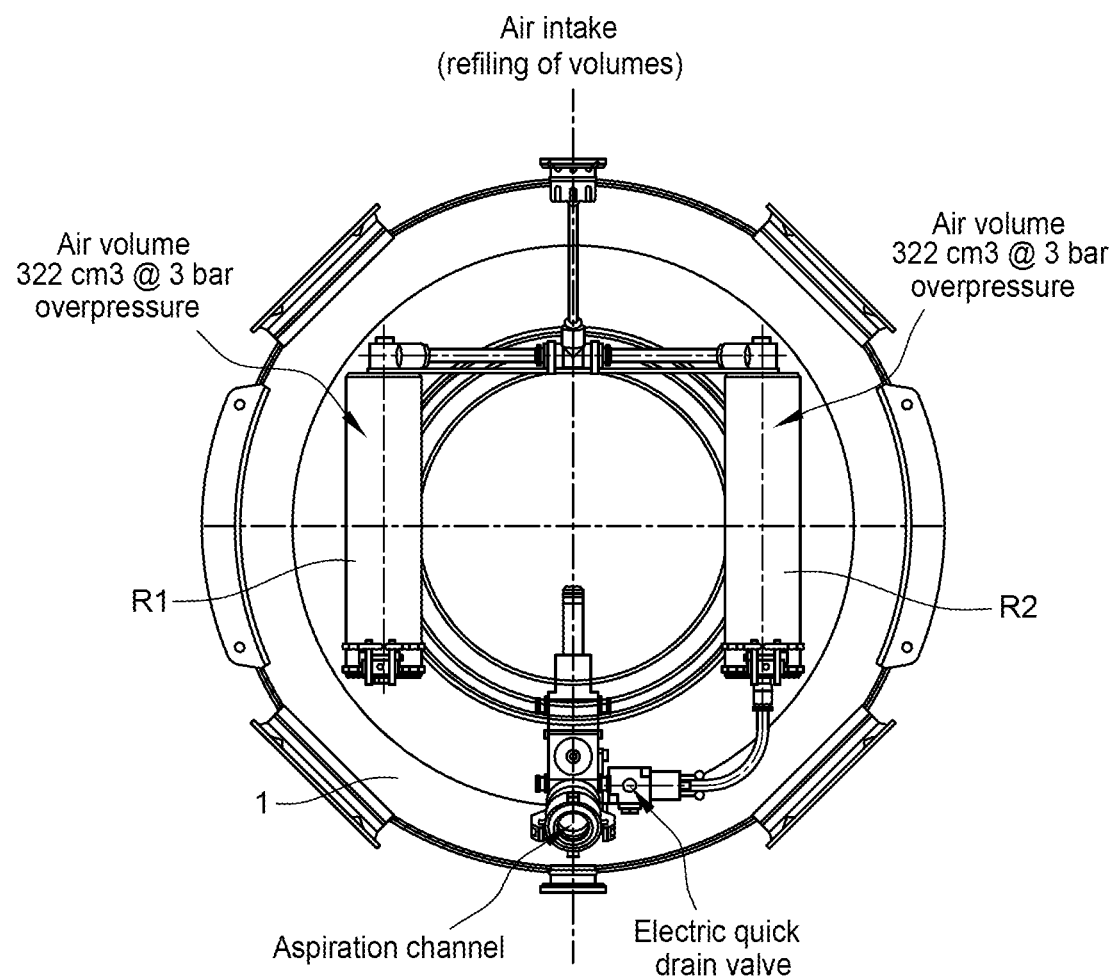
FIG. 8 represents a working robot integrating two compressed air tanks, according to a sample embodiment.

In FIG. 8, one may see a sample embodiment of the implementing of a compressed air tank of a robot 1, serving to unblock the pipes or conduits for evacuation and aspiration at the same time, comprising here two tanks R1 and R2. These two air tanks operate "in series" and are filled in parallel. At the top of FIG. 8 (at "12 o'clock"), one can see the air intake line. This is connected indirectly to the water surface. It is the pressure of the air which is sent to the robot which is used to supply these two tanks of air under pressure. These two air tanks are constantly recharged, since they are in line (in series) with the pressurized air intake of the robot. The pilot of the robot has the ability, when one of the sediment aspiration or evacuation openings is blocked, to actuate an electric valve for quick discharge of the two compressed air tanks, which are drained of their air at the same time, since they are connected in series. The air escaping from the right hand tank in FIG. 8 follows the conduits and is oriented equally in one or the other of the ends of the conduit, that is, in the direction of the sediment intake at the aspiration side, concentric with the injection nozzle, and on the other side in the direction of the sediment aspiration pump. The pilot of the robot has the ability to actuate the electric quick discharge valve as much as he so desires, since the two air tanks are constantly brought back to their maximum pressure.

The compressed air contained in the tank or tanks of the robot 1 can also be used to inflate a reascent balloon making it possible to bring a collection bag or any other object back to the water surface. This avoids the need for divers to make use of compressed air cylinders. The inflating of a balloon can be controlled by a diver located near the robot 1 or by a remote operator, from the control device 2.

Each robot receives, through a transmission cable, an electric current (electric voltage), an optical fiber to carry digital information, and a gas under pressure. The gas is injected inside the robot so that the pressure exerted internally, on the inside of the robot, is always slightly greater than the surrounding pressure exerted by the water. This prevents a deformation of the outer shell of the robot. Moreover, in event of a loss of tightness in the robot, the pressurized gas inside the robot would be evacuated to the outside and would be detectable by the appearance of visible bubbles in the location of the loss of tightness of the robot. Furthermore, this slight difference between the internal and external pressures of the robot prevents air from penetrating into the drone, which would obviously damage its electrical components.

Figure 6:
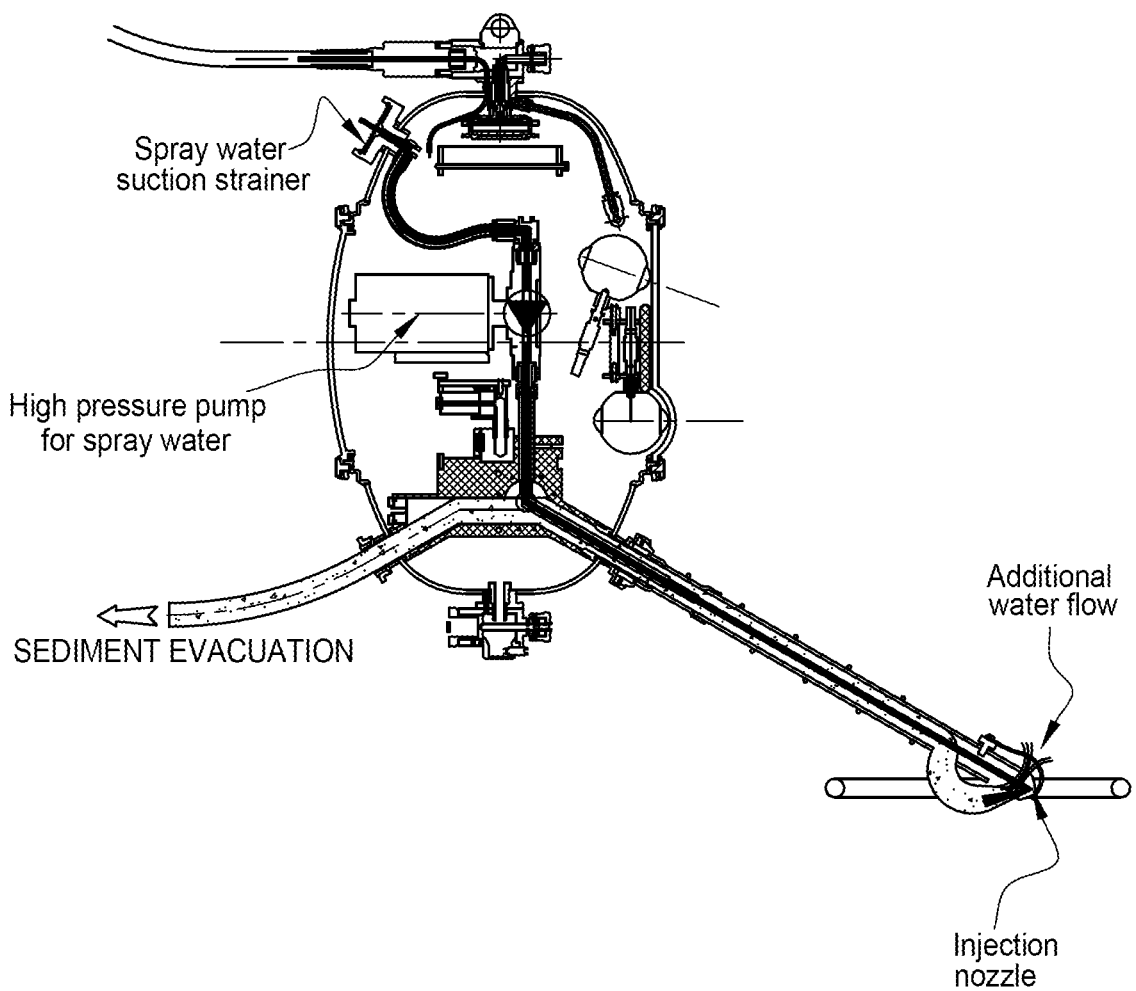
FIG. 6 represents a working robot, in cross section, integrating a spray water pump, according to a particular embodiment.

In FIG. 6, a working robot is represented in perpendicular section passing through the center and in the vertical plane. One can see at 12 o'clock of this drawing the entrance of the cable in contact with the surface and, at the bottom of the sketch, a cross section of the injection nozzle. The robot contains at its center a high-pressure pump used for the spraying of water by means of the injection nozzle. Once the pump is turned on, for example on demand of a pilot, it aspirates surrounding water through a suction strainer, which water under the effect of the high pressure of the pump is redirected into the injection nozzle. At the end of this nozzle is a reflecting plane of the water jet, forcing it to make an angle nearly parallel to the artifacts or objects being cleared away. When the injection nozzle begins its work of clearing away sediment, the sediment is aspirated by the sediment evacuation channel, which obtains its aspirating power from the central robot in which the aspiration pump common to all the working robots is arranged. The sediment evacuation channel is arranged concentrically to the injection nozzle. Thus, if the water jet at high pressure of the injection nozzle is simply directed into the zone of sediments of a possible buried artifact, the sediment projected into the water would produce a kind of murkiness degrading the visibility. The sediment released from the ground is immediately aspirated and in this way a sufficient visibility for working is guaranteed. The robot is equipped with two pairs of motors for its movements. When the robot is working near the ground during the dislodging of sediments, it is possible to not use the motors any longer, so as not to create this "murkiness" which reduces the visibility to zero.

We note that the taking of the sediments into the robot makes it possible to analyze the "water pollution" in real time.

The design of the whole is thus simplified, since all the detection devices are accommodated inside the robot, which enables immediate connections between the different technologies used.

Figure 7:
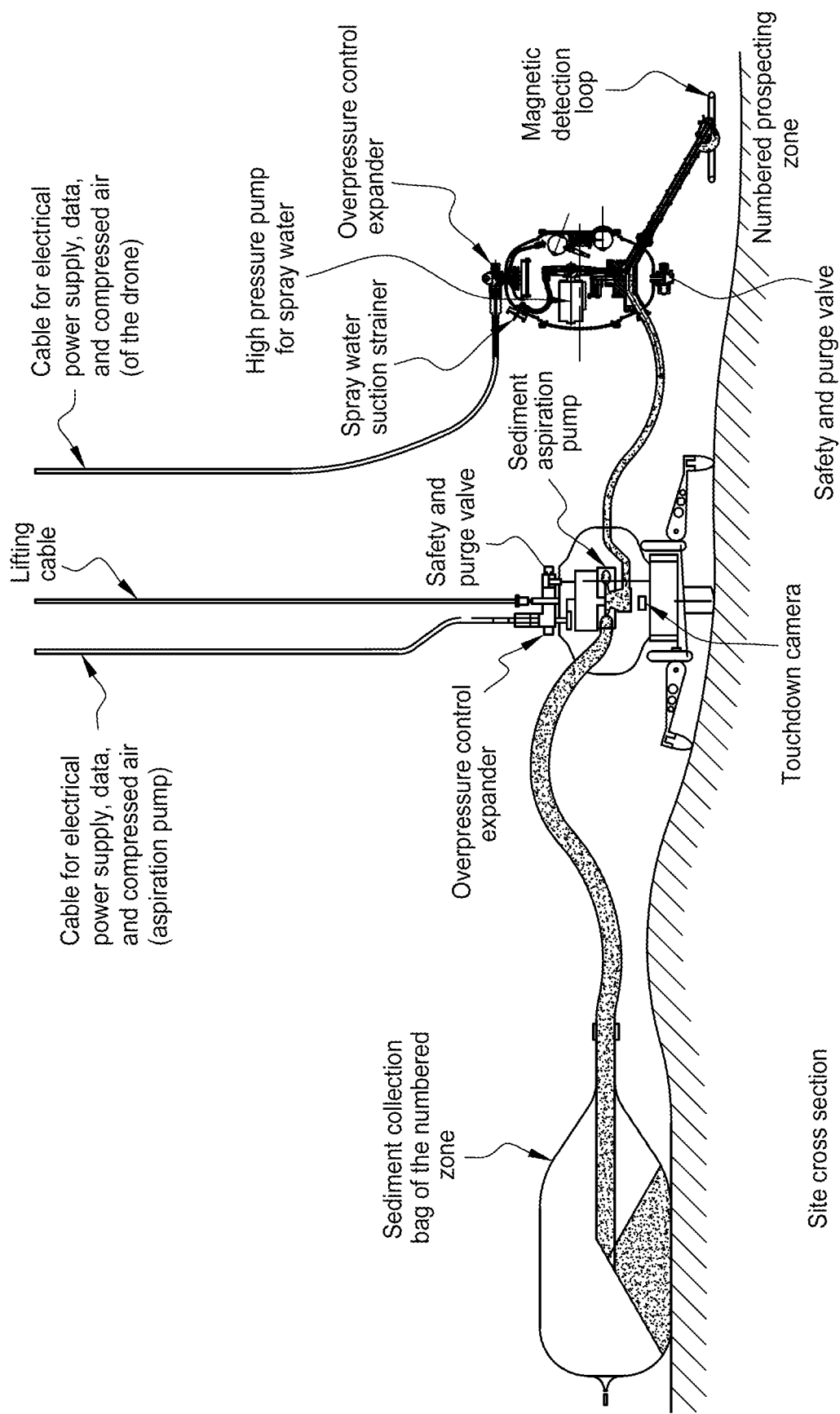
FIG. 7 represents a central robot, connected to a working robot and to a collection bag, at a prospecting site, in cross section.

FIG. 7 represents a diagram visualizing the path of the different flows. For example, it will be understood that the central or main robot, set down on the three arms B1-B3, contains the common pump for aspiration of sediment. This is controlled from the surface by the power supply cable, which contains the electrical power supply as well as an optical fiber for the data and the compressed air. When this sediment aspiration pump is activated, it sucks in sediment through the main aspiration pump and evacuates it into a collection bag.

Figure 10:
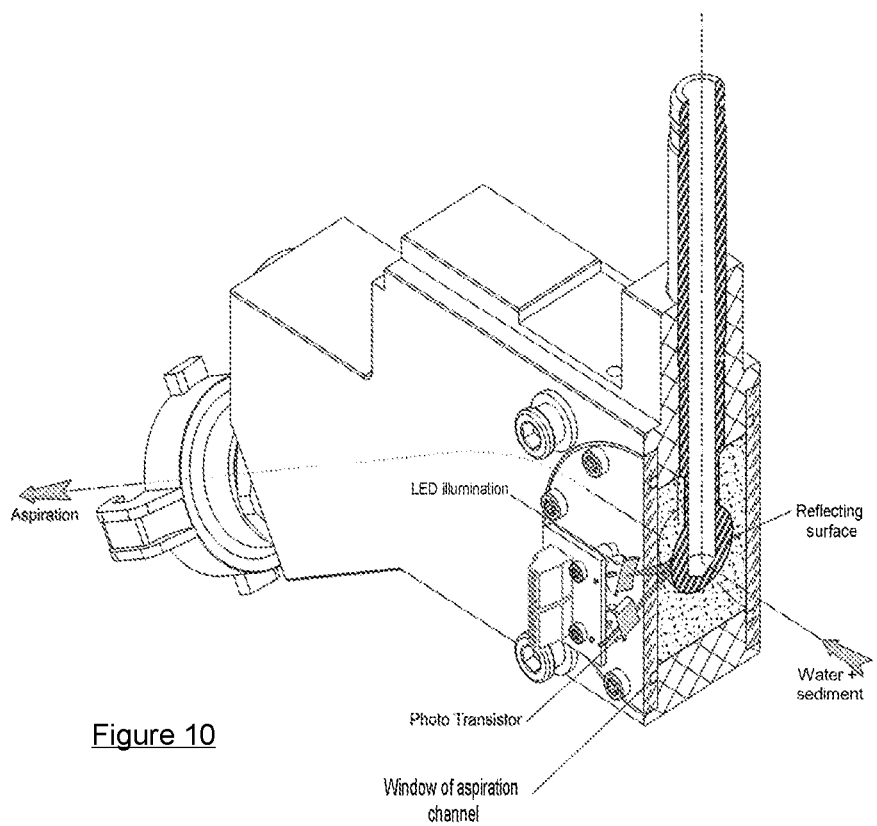
FIG. 10 represents a sample embodiment of a turbidity measuring apparatus outfitting a working robot.

It is important that, during excavations, the sediment aspiration system in fact absorbs the sediment, since the pumping system will not distinguish between the clean water and the water burdened with sediment. For this purpose, the working robot may be equipped with a device for measuring turbidity, that is, the proportion of sediment contained in the water moving through the drone in the direction of the main drone acting as the sediment pump, which is installed in the passage traversed by the water laden with sediment. A sample embodiment of this device is represented in FIG. 10. This measurement consists in an illumination by LED of the water and the sediment passing in front of this illumination Opposite this illumination, a reflecting surface sends the light to a "phototransistor", which analyzes the quantity of residual light. When the light intensity measured in the phototransistor is greatly reduced in relation to the LED illumination, it is determined that there is sediment in the water. On the other hand, if no difference in light is found between the light emitted by the LED and the light detected by the phototransistor, it is determined that there is only water (without sediment) in the passage analyzed. This measurement is supplemental and also provides information as to the nature and the composition of the ground being worked, for if the pilot of the robot is viewing the work which he performs in 3D, the only way to be certain that he is aspirating, or clearing away sediment, is to confirm that he is digging a hole in the ground at the place where he is working. The measuring of the turbidity also helps the pilot in adjusting the power of the water propulsion jet intended to clear away the objects buried beneath the sediment.

Figure 11:
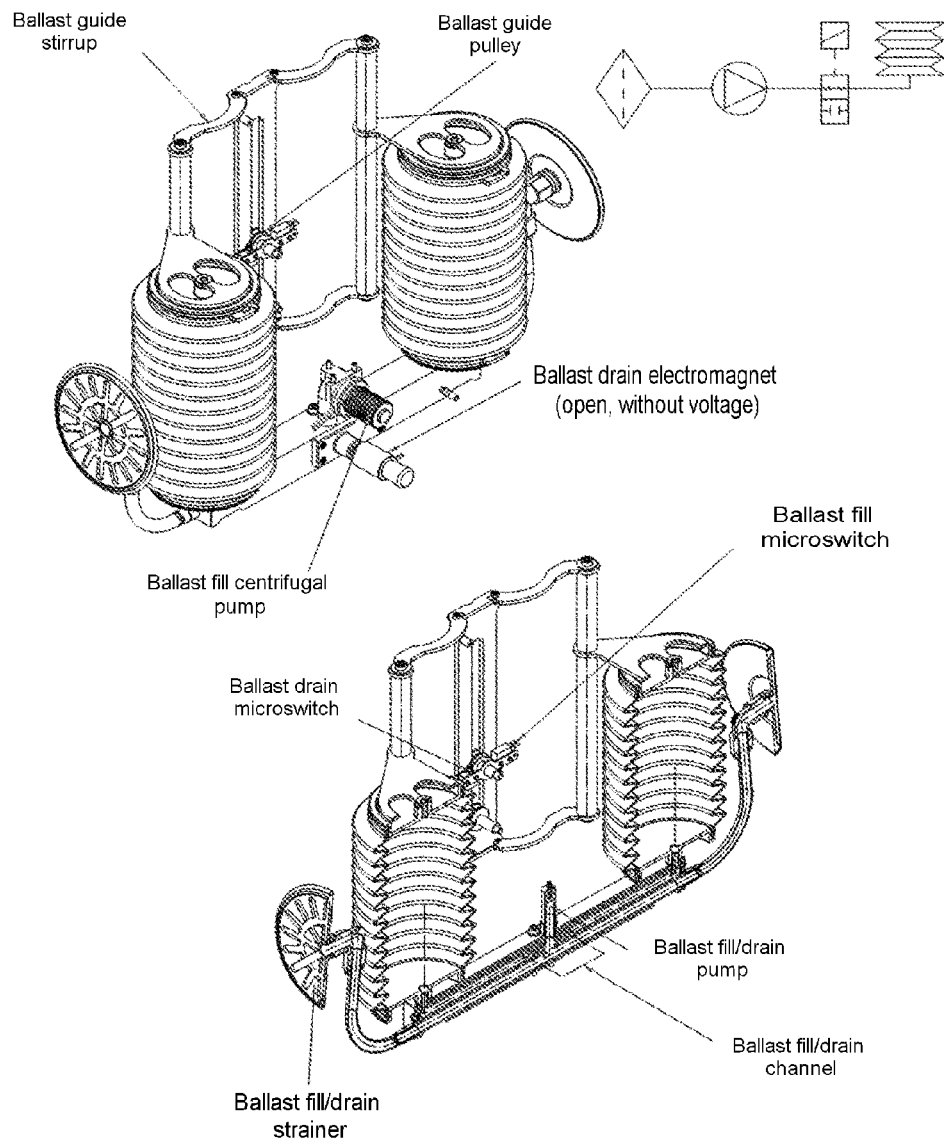
FIG. 11 represents a pair of ballasts outfitting a working robot according to a sample embodiment.

The working robot 1 may be equipped with one or more ballasts, for example, a pair of ballasts as represented in FIG. 11. This pair of ballasts is lodged inside the robot. They are made of flexible rubber and have the shape of a cylindrical accordion or a bellows. The basic principle is as follows: when the ballasts are filled with water, the weight of the robot increases, while the volume of air inside the robot continues to decrease. These two factors cause the robot to descend to the sea floor. On the other hand, when the ballasts are drained of the water which they contain, their volume decreases greatly. This has the effect of lightening the robot and increasing the volume of air in the drone, which allows it to return to the water surface. This system of ballasts is primarily used to stabilize the robot at a certain depth, that is, to allow it to find its equilibrium, so that the robot remains at its depth without the need for propulsion motors. A pump for filling and draining the ballasts is lodged inside the robot. When this pump takes in surrounding water by means of a filling channel, the water is taken in through two side filling strainers. During this pumping of water, the ballasts are filled with water, while the pump takes in water. A fill switch for the ballasts is positioned at the top of the two bellows so that when the bellows reach their fill limit the switch makes contact with an end stop and sends a signal to stop the pumping. Of course, one may halt the pump before the bellows are at the end stop, so as to fill the ballasts more or less. In this particular case, the robot has a tendency to descend, since its weight is increased. To cause the robot to ascend again, it is lightened by cutting off the power supply current to the pump. An electromagnet for draining the ballasts opens when the circuit is deenergized, and under the action of the pressure on the inside of the robot the bellows are drained of their water, which moves through the channel for draining the ballasts. Thus taking the same path, the water emerges through the ballast drain strainers Thanks to this, in event of an involuntary cut-out of current, for example due to cable rupture or some malfunction, the robot is drained of the water contained in the ballasts, and thus its content is lightened and it ascends back to the surface, instead of otherwise diving until it is halted by the ground.

The working robot 1 may be equipped with two standard 2D cameras in order to obtain a stereoscopic view, that is, a concatenation of two 2D films, the result of which may be called "3D film" or "stereoscopic film". For this purpose, means of control of these two 2D cameras are provided to produce the angle variation needed for the correction of strabismus.

Figure 12:
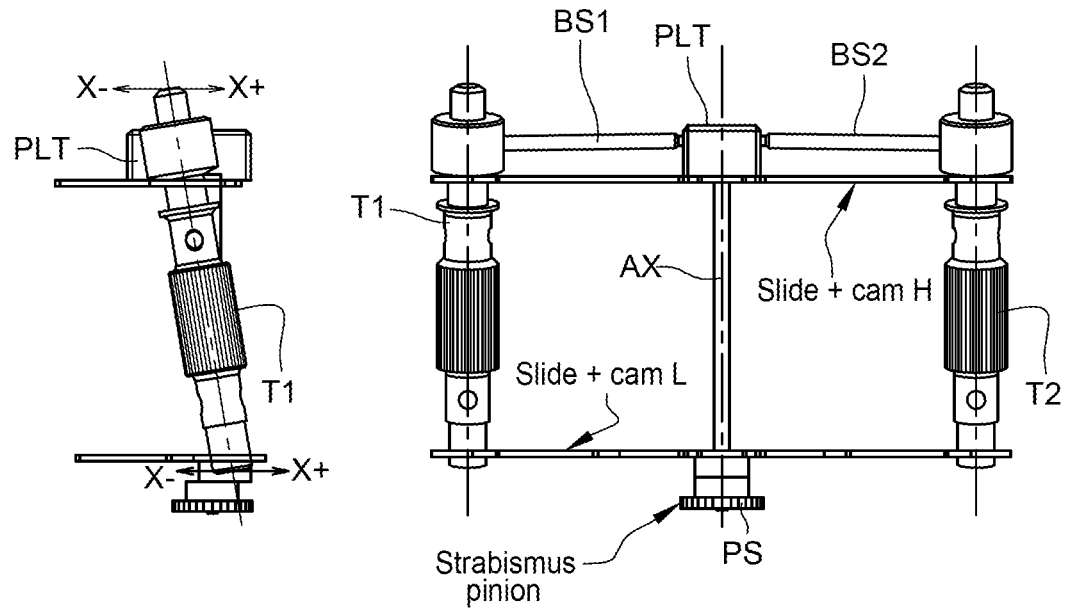
FIG. 12 represents different views of a support system for two cameras outfitting a working robot according to a sample embodiment.
Figure 12:
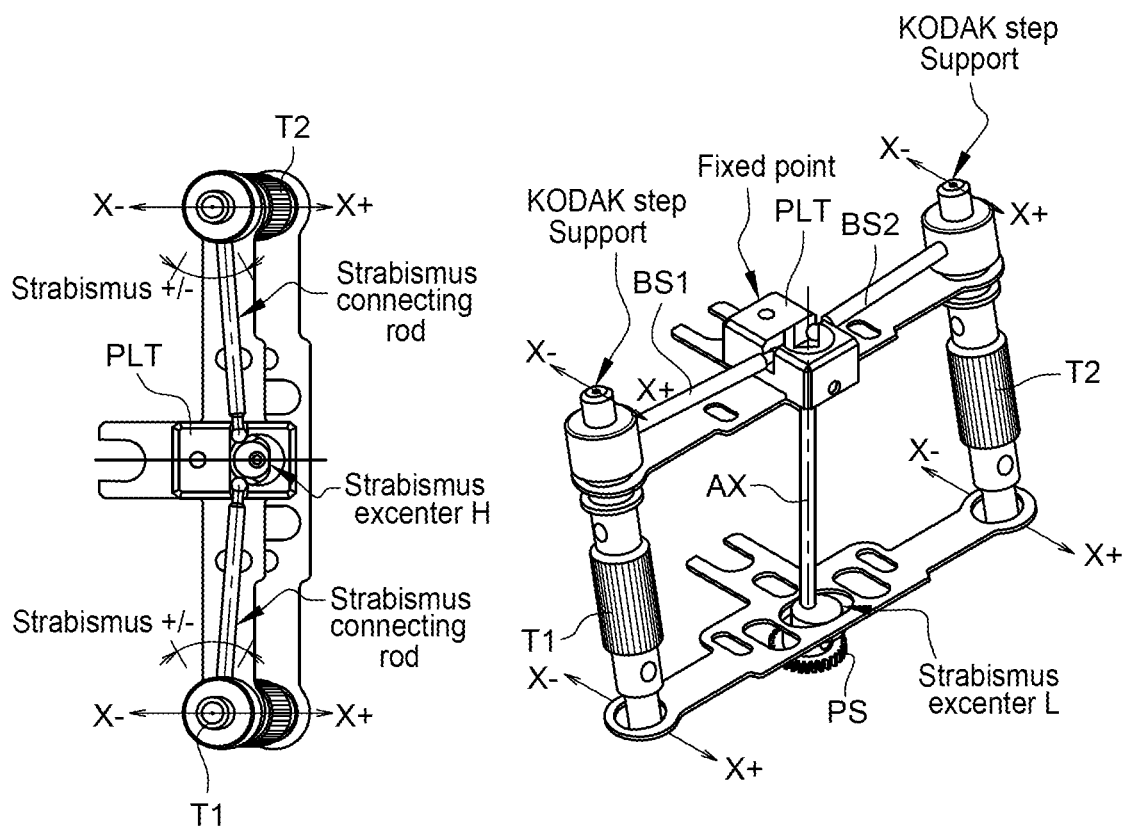

FIG. 12 represents a support system for two 2D cameras. A block PLT is integrated with the entire frame (chassis) of the inside of the robot. A vertical axis AX is also integrated with the chassis, but free in its rotation so that the "strabismus pinion" PS can be actuated in one direction or the other. On this axis AX, two strabismus excenters H and L are mounted symmetrically opposite on this axis. The one H is placed in the block PLT and the other L at the bottom near the strabismus pinion PS. These 2 excenters H and L drive in their movement of rotation on their sidewalls two slides (bottom and top), each one inside an oval opening by applying a movement along the X axis, such that when the strabismus pinion is rotated the inverted cams provide a contrary movement to the two slides when one is positive on the X axis, the other is negative, and conversely, which has as its first result a forward or backward inclination of two camera support rods T1 and T2. During this inclination movement, the camera support axes T1, T2 should also rotate on themselves and in opposite manner, which is accomplished thanks to two connecting rods BS1 and BS2 each of which is integrated by one end with the support.

The invention claimed is:

1. Equipment for assisting underwater exploration, comprising an underwater robot and a device for remote control of the underwater robot, able to communicate with each other, wherein the underwater robot is driven in movement and comprises an image capturing device;

the remote control device comprises 3D glasses configured such that a user wearing the 3D glasses virtually views an underwater environment of the underwater robot in three dimensions on a basis of images captured by the underwater robot; and wherein the 3D glasses are configured to detect head movements of the user wearing the 3D glasses and guide a movement of the underwater robot based on the detected head movements of the user;

the underwater robot is configured such that the movement of the underwater robot is remotely guided by the user wearing the 3D glasses based on the detected head movements of the user while the user virtually views the underwater environment from the underwater robot visualized in three dimensions; and wherein the underwater robot includes a plurality of orientable drive motors distributed around a periphery of the underwater robot that are configured to be oriented based on the detected head movements of the user such that an orientation of the underwater robot is guided by head movements of the user.

2. The equipment as claimed in claim 1, wherein the 3D glasses are designed to be worn by a user situated outside the water.

3. The equipment as claimed in claim 1, wherein the 3D glasses are integrated in a diving mask and are designed to be worn by a diver user situated in water.

4. The equipment as claimed in claim 1, wherein the underwater robot comprises a jet propulsion nozzle from which a jet of pressurized water is emitted for clearing away deposits from a zone.

5. The equipment as claimed in claim 4, wherein the underwater robot comprises an aspiration pipe for deposits.

6. The equipment as claimed in claim 5, wherein the aspiration pipe is disposed concentrically around the propulsion nozzle.

7. The equipment as claimed in claim 5, wherein the underwater robot comprises a pipe for evacuation of aspirated deposits.

8. The equipment as claimed in claim 7, wherein the pipe for evacuation has a length of at least 5 m.

9. The equipment as claimed in claim 7, wherein the evacuation pipe is provided with at least one filter designed to recover fragments of an object.

10. The equipment as claimed in claim 1, wherein the underwater robot is provided with at least one adjustable antenna having a lighting device.

11. The equipment as claimed in claim 1, wherein the underwater robot comprises a housing having a front face and a rear face and an annular sidewall.

12. The equipment as claimed in claim 11, wherein the annular sidewall carries a plurality of motors for driving a rotation of blades.

13. The equipment as claimed in claim 12, wherein the annular sidewall carries four motors disposed symmetrically and offset from each other by an angle of 90°.

14. The equipment as claimed in claim 1, wherein the underwater robot comprises a removable water-tight cover.

15. The equipment as claimed in claim 1, wherein the underwater robot is outfitted with a screen designed to visualize images selected from the group consisting of (i) images coming from the remote control device and (ii) images captured by the image capturing device of the underwater robot.

16. The equipment as claimed in claim 15, wherein the underwater robot comprises a housing having a front face and a rear face and an annular sidewall, and is provided with a glass mounted at one of the faces of the housing, behind which the screen is disposed.

17. The equipment as claimed in claim 5, wherein the aspiration pipe is an aspiration pipe for sediments released by the jet propulsion nozzle.

18. The equipment as claimed in claim 8, wherein the pipe for evacuation has a length of from 5 to 10 m.

19. Equipment as claimed in claim 12, wherein the blades are orientable blades.

* * * * *